United States Patent Office 3,553,553
Patented Jan. 5, 1971

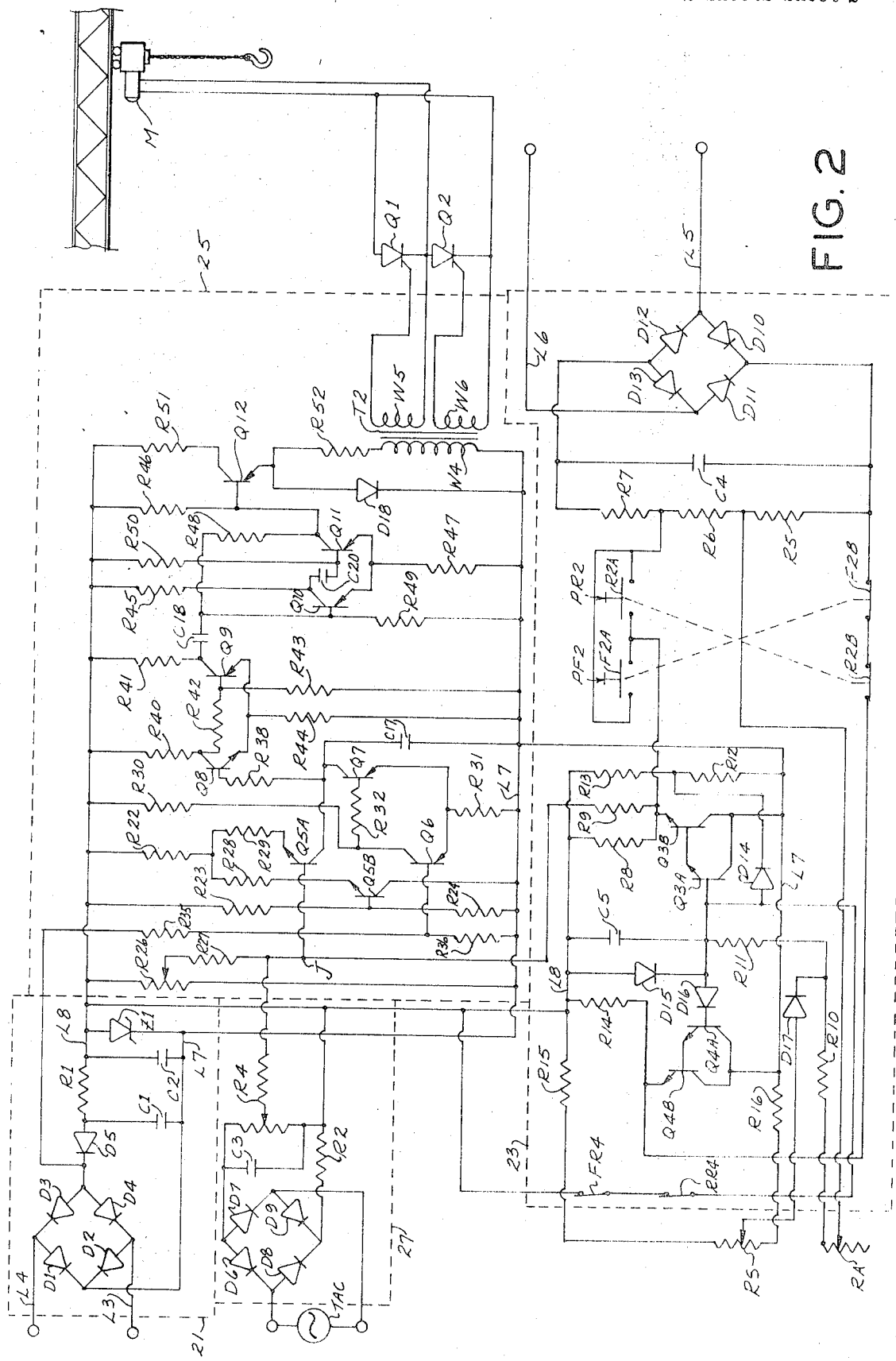

3,553,553
HOIST CONTROL SYSTEM UTILIZING REVERSIBLE, VARIABLE SPEED INDUCTION MOTOR
John P. Truemper, West Helena, Ark., assignor to Eaton Yale & Towne Inc., Cleveland, Ohio, a corporation of Ohio
Filed Apr. 28, 1969, Ser. No. 819,672
Int. Cl. H02p 1/42
U.S. Cl. 318—202
19 Claims

ABSTRACT OF THE DISCLOSURE

Apparatus for controlling the movement of a hoist in a lateral direction by means of a reversible A.C. induction motor. A circuit supplies A.C. power to the motor, the circuit including a triggerable semiconductor current switching device for varying the average power supply to the motor in response to variations in the phase of triggering. A controller includes manually operated switch means and means for generating a D.C. reference signal, the amplitude of which changes linearly in response to operation of the switch means. Means is provided which is responsive to the relative amplitudes of this D.C. reference signal and a D.C. feedback signal varying with the speed of the motor, for varying the phase of triggering of the switching device to change the motor speed linearly, providing substantially constant lateral acceleration of the hoist.

BACKGROUND OF THE INVENTION

This invention relates to a hoist and more particularly to apparatus for controlling lateral movement of a hoist by means of a trolley or trolley bridge.

In lateral movement of a hoist along a hoist trolley or by means of a trolley bridge or the like, if constant accelerative forces are not applied as the load is accelerated positively or negatively, there is introduced an undesirable oscillation of the load resulting in a pendulum or swinging action or, in the case of a stacker crane, a vibration. Such swinging or vibration is undesirable since, inter alia, it causes difficulty in positioning of the load. Even though the operator of the hoist could be provided with an infinitely variable speed control, his manual adjustment to increase or decrease speed would still fail to provide constant accelerative forces. It is therefore desired that increase or decrease in speed be carried out automatically.

SUMMARY OF THE INVENTION

Among the several objects of the invention may be noted the provision of apparatus for moving a hoist in a lateral direction with substantially constant lateral acceleration; the provision of such apparatus for automatically linearly increasing or decreasing, upon operator demand, the speed of a drive motor for moving the hoist laterally; the provision of such apparatus including means for controlling movement of the hoist at an inching speed; the provision of such apparatus permitting adjustment of the rate of acceleration of the hoist, the maximum lateral running speed of the hoist, and the inching speed of the hoist; the provision of such apparatus for maintaining movement of the hoist at a constant preselected maximum running speed or inching speed; the provision of such apparatus which employs a relatively inexpensive induction motor; and the provision of such apparatus which is highly reliable, relatively simple and inexpensive. Other objects and features will be in part apparent and in part pointed out hereinafter.

Briefly, apparatus of the present invention for moving a hoist in a lateral direction employs a reversible A.C. induction drive motor for moving the hoist laterally. A circuit supplies A.C. power to the motor, the circuit including a pair of triggerable semiconductor current switching devices for varying the average A.C. power supplied to the motor in response to variations in the phase of triggering of the current switching device relative to the supplied A.C. power. Means for selectively reversing the motor allows the hoist to be driven in either forward or reverse directions. The apparatus includes a controller including manually operated switch means and a ramp function generator for generating a D.C. reference signal, the amplitude of which changes linearly with respect to time in response to operation of the switching means and represents a desired linear change in the speed of the motor. The motor drives a tachometer or other means for providing a D.C. feedback signal, the amplitude of which varies as a function of the speed of the motor. The apparatus includes circuitry responsive to the relative amplitudes of the reference signal and the feedback signal for varying the phase of triggering of the current switching devices, so that the power supplied to the motor is varied to change linearly the motor speed in accordance with the D.C. reference signal, thus providing substantially constant lateral acceleration of the hoist.

BRIEF DESCRIPTION OF THE DRAWINGS

FIG. 2 is a schematic circuit diagram of the apparatus of this invention.

Corresponding reference characters indicate corresponding parts throughout the several views of the drawings.

DESCRIPTION OF THE PREFERRED EMBODIMENT

Figure 1:
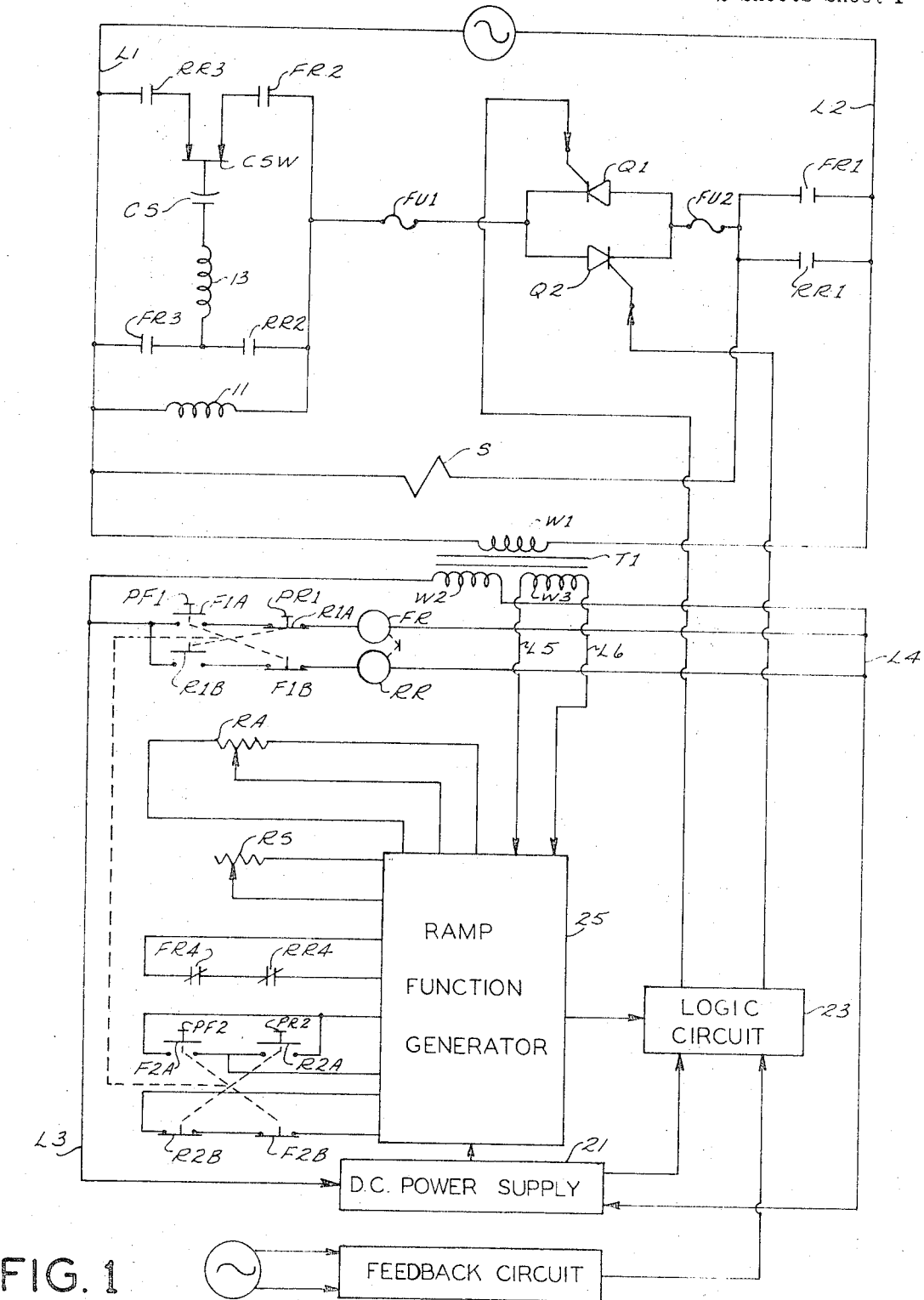
FIG. 1 is an overall wiring diagram, in partly block diagrammatic form, of apparatus of this invention.

Referring now to FIG. 1, apparatus of this invention is illustrated for controlling the movement of a hoist laterally along the trolley of a trolley bridge (see FIG. 2). A single-phase squirrel care A.C. induction motor M is employed for driving the hoist along the trolley. It will be understood that the motor M could instead be employed for driving the bridge. The motor includes a run winding 11 and a start winding 13, the start winding being connected in series with the conventional starting capacitor SC and a centrifugal starting switch CSW. For stopping movement of the hoist when motor M is de-energized, a brake (not shown) is provided, the brake being controlled by a solenoid S for conventionally releasing the brake when the solenoid is energized.

A.C. power for the apparatus is obtained through a pair of leads L1 and L2 from a conventional single-phase A.C. source and is selectively supplied from lines L1 and L2 to the motor M and to the brake solenoid S by circuits which include a plurality of normally open contacts FR1, FR2 and FR3 which are closed by the energization of relay FR for causing the hoist to move in one direction, e.g., forward, along the trolley, or by means of normally open contacts RR1, RR2 and RR3 which are closed by the operation of a relay RR for causing the hoist to be moved in the opposite direction, i.e., in the reverse direction. Relays FR and RR together comprise a motor reversing switch or contactor, their armatures being interlocked such that operation of one of the relays, closing its contacts, opens the contacts of the other relay and vice versa. Operation of the relays will be described in greater detail hereinafter. The circuit to the motor windings includes a pair of fuses FU1 and FU2 and a pair of SCR's (silicon controlled rectifiers) Q1 and Q2 which are oppositely connected in parallel for alternative conduction on successive A.C. half cycles, as illustrated. As is understood by those skilled in the art, SCR's Q1 and Q2 are triggerable semiconductor current switching devices which will supply A.C. power to motor M when appropriately triggered, the amount of power supplied being a function of the phase of triggering relative to the phase of the applied A.C. Closing of the contacts FR1, FR2 and FR3 provides a circuit across lines L1 and L2 to pass A.C. power, on triggering of Q1 and Q2, to rotate the motor in one direction. Closing of contacts RR1, RR2 and RR3 passes A.C. power to the windings to rotate the motor in the opposite direction. Solenoid S is energized to release the motor brake when either set of contacts is closed.

The primary winding W1 of a step-down transformer T1 is also connected across lines L1 and L2. A secondary winding W2 provides A.C. power to a pair of leads L3 with a reduced voltage suitable for powering semiconductor circuits of the apparatus. Relay winding FR is connected across lines L3 and L4 by a circuit which includes a set of normally open contacts F1A of a push button switch PF1 and the normally closed contacts R1A of a push button switch PR1. Similarly, relay RR is connected across lines L3 and L4 in a circuit including the normally closed contacts F1B of push button switch PF1 and the normally open contacts R1B of push button switch PR1. Contacts F1A are ganged to contacts F1B so that when one set of contacts is open, the other set of contacts is closed, and vice versa. Contacts R1A and R1B are similarly ganged so that closure of one set of contacts opens the other set of contacts, and vice versa. Push button switches PF1 and PR1 are provided for causing the hoist to be moved at a predetermined forward or reverse inching speed.

A.C. power supplied from lines L3 and L4 also energizes a D.C. power supply indicated at 21 in FIG. 1 which supplies D.C. to a logic circuit 23 for varying the phase of triggering of the SCR's Q1 and Q2 as will hereinafter be explained, and to a ramp function generator 25. Transformer T1 includes another secondary winding W3 providing power at a reduced voltage across a pair of leads L5 and L6 to a ramp function generator 25.

Connected for controlling the operation of the ramp function generator 25 is a set of normally closed contacts FR4 which are opened by the energization of relay FR and normally closed contacts RR4 which are opened by the energization of relay RR. For causing the hoist to be accelerated constantly to its maximum forward running speed is a push button switch PF2 having normally open contacts F2A. Ganged with contacts F2A are normally closed contacts F2B for causing the hoist to decelerate constantly from its maximum running speed. Contacts F2B are opened upon closure of the contacts of switch F2A and vice versa. Similarly, a push button switch PR2 having normally open contacts R2A is provided for causing the hoist to accelerate constantly to its maximum running speed in the reverse direction. Contacts R2A are ganged with a set of normally closed contacts R2B for causing the hoist to be decelerated constantly from its maximum reverse running speed. Contacts R2B are opened when contacts R2A are closed, and vice versa. The sets of push button switches PF1, PR1 and PF2, PR2 are interlocked so that switches PF1 and PR1 may be independently operated but operation of switches PF2 or PR2 causes simultaneous operation of switches PF1 or PR1, respectively, for a purpose which will be explained. Push button switches PF2 and PR2 provide switch means for causing the ramp function generator to generate a ramp function which is used as a D.C. reference signal. The amplitude of this D.C. reference signal changes linearly with respect to time and is supplied to logic circuit 23. Ramp function generator 25 is also provided with an acceleration rate control potentiometer RA for preselecting the rate of acceleration of the hoist. A slow speed control rheostat RS permits the operator to preselect an inching speed of the hoist. The switches PF1, PR1, PF2 and PR2, controls RA and RS, and ramp function generator 25 together comprise a controller for lateral movement of the hoist.

An A.C. tachometer TAC is mounted on the shaft of motor M to provide an A.C. signal the amplitude of which varies as a function of the actual speed of the motor. This A.C. signal is rectified and filtered in a circuit indicated at 27 in FIG. 1 to provide a D.C. feedback signal to logic circuit 23. As is described in greater detail hereinafter, logic circuit 23 operates to vary the phase of triggering signal supplied to SCR's Q1 and Q2 as a function of the relative amplitudes of the reference signal supplied by ramp function generator 25 and the feedback signal supplied from the feedback circuit 27.

Referring now to FIG. 2, the D.C. power supply 21 includes a full-wave bridge rectifier constituted by diodes D1-D4. A.C. power is supplied to the bridge through lines L3 and L4 and the pulsating D.C. provided by the bridge is smoothed by a filter including capacitors C1 and C2 and a resistor R1 to provide a uniform supply of D.C. across a pair of leads L7 and L8. The D.C. voltage across leads L7 and L8 is regulated bp a Zener diode Z1. The full-wave pulsating D.C. provided by the rectifier bridge is isolated from the filtered D.C. by a diode D5 to provide a source of pulsating voltage at twice the supply frequency for purposes described in greater detail hereinafter.

The tachometer generator TAC driven by by motor M provides an A.C. signal which varies in amplitude as a function of the motor speed and which is preferably proportional thereto. The A.C. tachometer signal is rectified by a full-wave bridge constituted by diodes D6-D9 and is filtered by a capacitor C3 and a resistor R2. A preselected portion of the D.C. voltage is obtained by means of a potentiometer R3 and is applied, through an isolating resistor R4, to a mixing junction J where it is bucked against the D.C. reference signal obtained from the ramp function generator 25.

The ramp function generator 25 includes a capacitor C5 which, as will be explained, is selectively charged or discharged at a substantially constant current so that the voltage thereacross is a linear function of time. Connected with capacitor C5 is a transistor emitter follower circuit comprising a Darlington-coupled pair of transistors Q3A and Q3B, the emitter of transistor Q3A being connected directly to the base of transistor Q3B. Capacitor C5 is connected between line L8 and the base of transistor Q3A. Connected between the emitter of transistor Q3B and line L8 is a load resistor R8. As those skilled in the art will appreciate, the voltage at the emitter of transistor Q3B, i.e., the voltage drop across resistor R8, is appoximately equal to the voltage across capacitor C5, and it is this voltage which is applied as a D.C. reference signal to mixing junction J through a resistor R9.

Power is supplied by means of leads L5 and L6 to a full-wave bridge rectifier constituted by diodes D10-D13. The D.C. output provided by the bridge is smoothed by a filter capacitor C4 and is applied across a voltage divider network comprising series-connected resistors R5, R6 and R7. The voltage drop across resistors R5 and R6 provides respective substantially constant D.C. voltage sources for a purpose shortly to be explained.

When either of the switch contacts F2A or R2A is closed, a series charging circuit for capacitor C5 is completed with the substantially constant voltage appearing across resistor R6 supplying a potential to cause charging. Analogously, contacts R2B and F2B, shown in their normally closed position, provide a path for discharge of capacitor C5, this discharge being controlled by the substantially constant voltage appearing across R5.

A diode clamping circuit including a diode D14 is provided for preventing the voltage across capacitor C5 from exceeding a predetermined maximum upon charging of the capacitor. Diode D14 is connected between capacitor C5 and the junction of a pair of resistors R12 and R13 connected across leads L7 and L8 and constituting a voltage divider network for reverse biasing diode D14 until the voltage across capacitor C5 is high enough to cause the diode D to become forward biased. When diode D14 becomes conductive it prevents further charging of capacitor C5, maintaining the voltage thereacross at the predetermined maximum. A diode D15 connected across capacitor C5 prevents the voltage across the capacitor which appears at the base of transistor Q3A from becoming negative with respect to line L8.

Because of the emitter follower configuration of transistor Q3A and Q3B, the voltage at the emitter of transistor Q3B is substantially equal to 0.9 times the voltage at the base of transistor Q3A, i.e., the voltage appearing across capacitor C5. In other words, the Darlington-coupled pair of transistors Q3A and Q3B constitutes means for generating a voltage approximately equal to the voltage across capacitor C5. As is thus seen, the voltage at the emitter of transistor Q3B may be considered to be a voltage source and, when either of contacts F2A or R2A is closed, is connected in a charging circuit with resistor R6, the voltage across this resistor constituting a substantially constant D.C. voltage source. The charging circuit further includes a connection from the junction of resistors R6 and R5 through the acceleration rate control rheostat RA, the latter constituting a variable impedance for varying, as will be seen, the rate of charging and discharging of capacitor C5. Finally, the charging circuit includes a resistor R10 and a resistor R11 connecting the circuit to capacitor C5. Since the voltage at the emitter of the transistor Q3B essentially follows the voltage across capacitor C5, this series charging circuit may be considered to be a "bootstrap" charging circuit for causing capacitor C5 to charge at a substantially constant rate so that the voltage across the capacitor is a linear function of time.

A circuit for selectively discharging capacitor C5 includes a diode D16 and a second Darlington-coupled pair of transistors Q4A and Q4B, capacitor C5 being connected through diode D16 to the base of transistor Q4A. Again, it will be appreciated that the voltage at the emitter of transistor Q4B is approximately equal to the voltage at the base of transistor Q4A, i. e., the voltage across capacitor C5. Connected from the emitter of transistor Q4B to line L8 is a load resistor R14. The voltage at the emitter of transistor Q4B may be considered a voltage source approximately equal to the voltage across capacitor C5. This source is connected in a discharging circuit by the closure of either of contacts R2B or F2B with resistor R5, the voltage appearing across resistor R5 representing a substantially constant D.C. voltage source of polarity opposite to the voltage of capacitor C5 at the base of transistor Q4A. The discharging circuit continues through acceleration rate control rheostat RA and resistors R10 and R11, the latter resistor being connected to capacitor C5. This series discharging circuit, like the charging circuit, is a bootstrap circuit since the voltage at the emitter of transistor Q4B is approximately equal to the voltage across capacitor C5, so that the current flowing in the circuit is substantially constant, causing discharge of capacitor C5 at a constant rate. Thus the voltage across capacitor C5 decreases linearly with respect to time when the discharging circuit is operative.

A circuit is provided for charging capacitor C5 to a relatively low voltage representing, as will be seen, a low motor speed for inching the hoist laterally. This circuit includes a resistor R15, slow speed control potentiometer RS, and a resistor R16, these resistances being connected across leads L7 and L8 and constituting a voltage divider network. The wiper of potentiometer RS is connected with a clamping diode D17 through resistor R11 to capacitor C5. Also connected in a shorting circuit across capacitor C5 are normally closed sets of contacts FR4 and RR4 which are opened by the energization of relays FR and RR, respectively. When either of contacts FR4 or RR4 are opened, capacitor C5 is permitted to be charged.

The diodes D6–D9 are oriented so that the feedback signal is of a polarity opposite that of the D.C. reference signal derived from ramp function generator 25. The resultant voltage appearing at junction J is thus a mixture or composite of the several voltages applied to the junction. This composite voltage is, in effect, an error signal which represents the difference between the actual speed of the motor M and the desired speed represented by the D.C. reference signal generated by the ramp function generator 25 in response to the operation of push buttons PF1, PR1, PF2 and PR2.

Logic circuit 23 operates to trigger the SCR's Q1 and Q2 in timed relation to the frequency of the applied A.C. power, the phase of triggering being varied as a function of the error signal. The error signal from junction J is applied to the base of an NPN transistor Q5A. Transistor Q5A and another NPN transistor Q5B together comprise a differential amplifier, the emitters of the two transistors being connected through a common resistor R22 to line L8. The base of transistor Q5B is biased at a fixed potential by a voltage divider network including a resistor R23 and R24 connected across lines L7 and L8. The base of transistor Q5A is also biased by the potential at the tap of a potentiometer R26 connected across lines L7 and L8, this voltage being applied to the base of transistor Q5A through a current limiting resistor R27. A resistor R28 is also connected in the emitter circuit of transistor Q5A.

At any given error signal level, transistor Q5 functions as a high impedance or substantially constant current source for charging a capacitor C17. C17 therefore charges substantially linearly with time. Capacitor C17 is also periodically discharged in synchronism with the applied A.C. power by a Schmitt trigger circuit comprising a pair of PNP transistors Q6 and Q7. Transistor Q6 is provided with a collector load resistor R30 and the collector of transistor Q7 is connected between the collector of transistor Q5 and capacitor C17. The collector of transistor Q6 is connected to the base of transistor Q7 by a resistor R32 to provide coupling between the two transistors and the emitters of the two transistors are connected together and to line L7 through a common resistor R31, which provides the regenerative feedback which gives the Schmitt trigger circuit its typical two-state characteristics.

The Schmitt circuit is triggered in synchronism with the applied A.C. power by a signal obtained from power supply 21 through a voltage divider constituted by resistors R35 and R36. As the diodes D1–D4 constitute a full-wave bridge and the filtered D.C. is blocked by diode D5, the voltage impressed across resistors R35 and R36 pulsates at twice the supply frequency, that is, there is a pulsation for each half cycle of the applied A.C. The trigger voltage applied by resistors R35 and R36 to the Schmitt circuit thus trigger it during each A.C. half cycle to discharge capacitor C17. As capacitor C17 is substantially linearly charged and is periodically discharged, it can be seen that the voltage appearing on capacitor C17 varies substantially according to a sawtooth characteristic.

The voltage on capacitor C17 is applied through a current limiting resistor R38 to a second Schmitt trigger circuit comprising a pair of PNP transistors Q8 and Q9. Each of the transistors Q8 and Q9 is provided with a respective load resistor R40 and R41 and coupling between the transistors is provided by a resistor R42 connecting the collector of transistor Q8 to the base of transistor Q9. A biasing resistor R43 is connected from the base of transistor Q9 to line L7. Regenerative feedback for providing two-state switching operation is obtained by means of a resistor R44 commonly connecting the emitters of both of transistors Q8 and Q9 to the line L7. As is understood by those skilled in the art, this Schmitt trigger circuit switches abruptly from a state in which Q9 is conducting to a state in which transistor Q8 is conducting when the voltage on capacitor C17 reaches a predetermined level.

When this Schmitt trigger circuit switches, a sharp pulse is coupled through a capacitor C18 to a one-shot multivibrator comprising a pair of PNP transistors Q10 and Q11. Each of transistors Q10 and Q11 is provided with a respective load resistor R45 and R46 and their emitters are commonly connected to line L8 through a resistor R47. Regenerative cross coupling for D.C. is provided by a resistor R48 connecting the collector of transistor Q11 to the base of transistor Q10. Cross coupling for A.C. is provided by a capacitor C20 connecting the collector of transistor Q10 to the base of transistor Q11. A biasing resistor R49 is connected from the base of transistor Q10 to line L7. Transistor Q11 is normally biased into conduction by a resistor R50 connecting its base terminal to the line L8. As is understood by those skilled in the art, this one-shot multivibrator circuit normally remains in a stable state in which transistor Q11 is conducting and transistor Q10 is cut off. However, when the circuit is triggered, the pulse coupled from the collector of transistor Q10 to the base of transistor Q11 by capacitor 20 will cut off transistor Q11 so that the circuit switches to a state in which transistor Q10 is conducting and transistor Q11 is cut off. This state lasts for a preselected interval until capacitor C20 is discharged by current flowing through resistor R50.

When the one-shot multivibrator is triggered by a pulse coupled from the Schmitt trigger circuit through the capacitors C18, it will generate a strong pulse of predetermined duration at the collector of transistor Q10. This pulse is applied, through a transistor Q12 connected as an emitter follower, to the primary winding W4 of a pulse transformer T2. A current limiting resistor R51 is provided in the collector lead of transistor Q12 and a resistor R52 is connected in series with winding W4. Winding W4, together with resistor R52, is shunted by a diode D18 which is oriented for suppressing the inductive kick of winding W4 when the pulse generated by the one-shot multivibrator is over and the supply of current to the winding is cut off.

Pulse transformer T2 includes a pair of secondary windings W5 and W6 each of which is connected across the gate cathode of a respective one of the SCR's Q1 and Q2. The pulses coupled to the gates of the SCR's when the one-shot multivibrator is triggered are operative to trigger into conduction that SCR which is then forward biased by the applied A.C. power. As noted previously the SCR's are oppositely connected in parallel so that they are alternately forward biased upon successive half cycles of the applied A.C. wave form.

Operation of the apparatus is as follows:

Assuming that the operator desires to cause the hoist to inch forward along the trolley, push button PF1 is depressed. This closes contacts F1A and opens contacts F1B. Relay FR is thereby energized and closes contacts FR1, FR2 and FR3, and opens contacts FR4. Motor M is thus connected across lines L1 and L2 with the start winding 13 being connected to produce forward rotation of the motor to move the hoist laterally forward. Solenoid S is simultaneously energized to release the motor brake. Motor M is energized to an extent determined by the phase of triggering of the SCR's Q1 and Q2.

The opening of contacts FR4 permits capacitor C5 to be charged to a relatively low inching voltage determined by the setting of the tap of the slow speed control potentiometer RS and this voltage is applied through D17 and resistor R11 to charge capacitor C5 to the inching voltage. This voltage appears at the base of transistor Q3A and, as a result, an approximately equal voltage appears at the emitter of transistor Q3B, the latter voltage being supplied through the limiting resistor R9 to junction J. Assuming that the motor M is not yet rotating, no feedback signal is derived from the tachometer and the voltage at junction J reflects only the desired inching speed. The voltage at junction J therefore forward biases transistor Q5A causing capacitor C17 to charge at a rate determined by the reference signal.

Within each A.C. half cycle the capacitor C17 charges to the tripping point of the Schmitt trigger comprising transistors Q8 and Q9, reaching that triggering point at a time or phase which is determined by the signal applied to the base of transistor Q5A. As described previously, when the triggering point is reached the Schmitt trigger trips and triggers the one-shot multivibrator circuit comprising transistors Q10 and Q11 into delivering a triggering pulse to the SCR's Q1 and Q2. Since the average A.C. power transmitted by the SCR's Q1 and Q2 to motor M depends upon the time or phase of triggering, it can be seen that the power supplied to the motor will also be varied as a function of the signal applied to the base of transistor Q5A.

The power transmitted by the SCR's Q1 and Q2 causes the motor M to operate and as its speed increases a feedback signal is generated by the tachometer TAC and its associated circuitry. This feedback signal is bucked against the reference signal from the ramp function generator 25, thereby reducing the driving signal applied to the base of transistor Q5A. In this way, a feedback or servo control of speed is obtained which causes the power transmitted to motor M1 to be varied to cause the speed of the hoist to be increased to the desired inching speed despite variations in load. When the motor reaches the desired inching speed, it is then maintained substantially at that desired speed through the feedback control provided by tachometer TAC and feedback circuit 27.

Assuming that the operator desires to increase the speed of the hoist to its maximum forward speed, push button PF2 is depressed. Since push buttons PF1 and PF2 are interlocked, when push button PF2 is depressed switch PF1 is also operated and thus maintains relay FR in its energized condition. Operation of switch PF2 closes contacts F2A and opens contacts F2B, thereby completing the charging circuit for capacitor C5. The voltage at the emitter of transistor Q3B, which approximates the voltage across capacitor C5, is added to the voltage across resistor R6. This voltage, limited by the acceleration rate control rheostat RA and resistors R10 and R11, is applied to capacitor C5. Because of the bootstrap action of the Darlington-coupled pair of transistors Q3A and Q3B, the charging current is substantially constant and the voltage across capacitor C5 therefore increases linearly with respect to time with a ramp characteristic until limited by diode D14, the diode, upon becoming forward biased, limiting further increase of the voltage across capacitor C5. This increasing voltage is applied to junction J, causing transistor Q5A to be biased into conduction as long as the actual speed of motor M is less than that represented by the increasing D.C. reference signal. Thus the SCR's Q1 and Q2 are triggered to cause the motor speed to increase in accordance with the increasing reference signal. Since the reference signal increases linearly with respect to time, the angular velocity of the motor is increased with constant angular acceleration and the hoist is accordingly driven with substantially constant lateral accelerative force, thereby minimizing any load swing or vibration. The maximum lateral speed of the hoist is predetermined by the setting of potentiometer R3 and, once determined for a particular hoist installation, would not ordinarily be changed by the operator during normal operation of the apparatus.

If now it is desired to decrease the speed of the hoist to the inching speed, push button PF2 is released but push button PF1 is held depressed. This opens contacts F2A and closes contacts F2B, thereby breaking the charging circuit and completing the discharging circuit. Operation of the discharging circuit is analogous to the operation of the charging circuit, the voltage appearing at the emitter of transistor Q4B being added to the voltage of opposite polarity across resistor R5. The resulting potential is applied through acceleration rate control rheostat RA and resistors R10 and R11 to cause a constant rate of discharge of capacitor C5. Its voltage thereby decreases linearly with respect to time. Since the voltage at the emitter of transistor Q3B continues to approximate the voltage across capacitor C5, the D.C. reference signal decreases linearly so that it has a decreasing ramp characteristic. The phase of triggering of the SCR's Q1 and Q2 is thus varied to cause the angular velocity of motor M to decrease with constant angular acceleration, corresponding with the desired linear change in the speed of the motor represented by the ramp function. As long as contacts FR4 remain open, capacitor C5 is prevented from discharging completely because of the inching speed charging circuit including potentiometer RS and diode D17 which causes the capacitor to be maintained at the inching voltage. Thus the hoist is decelerated, i.e., accelerated in the negative sense, from its maximum speed to the inching speed with substantially constant decelerative force.

If it is desired to stop the lateral movement of the hoist, push button PF1 is released and this deenergizes relay FR. Accordingly, contacts FR1, FR2 and FR3 are opened, preventing further power from being supplied to motor M and deenergizing the motor brake solenoid S. The motor brake brings the motor to a stop. In addition, contacts FR4 are closed, causing complete discharge of capacitor C5.

If it were desired to cause the hoist to be accelerated from a standstill to its maximum forward speed, push button PF2 would be depressed and, since it is interlocked with push button PF1, would also cause deenergization of relay FR.

Operation of the hoist in the reverse direction is essentially identical with forward operation as above described except that the reverse push button switch PR1, for inching of the hoist in the reverse direction, or push button switch PR2, for accelerating the hoist to its maximum speed in the reverse direction, would be depressed. Thus, relay RR, rather than relay FR, would be energized by the closing of contacts R1B upon depressing either of push buttons PR1 or PR2. If push button PR2 is depressed, contacts R2B are closed, contacts R2A are opened and capacitor C5 is charged at a constant rate so that the hoist accelerates linearly to its maximum reverse speed. On release of push button PR2, contacts R2A are once more closed, and the discharging circuit causes discharge of capacitor C5 so that the hoist is linearly decelerated.

It will be seen that there is a safety feature of the apparatus in that, if all push buttons are released while the hoist is moving laterally, then SCR's Q1 and Q2 cease to be triggered, motor M is disconnected, solenoid S is deenergized, and the trolley motor brake is thereby applied to cause the hoist to be brought to a standstill. Thus a "dead man" feature is provided.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for moving a hoist in a lateral direction comprising:
    means for moving the hoist laterally including a reversible A.C. induction drive motor;
    a circuit for supplying A.C. power to said motor, said circuit including at least one triggerable semiconductor current switching device for varying the average A.C. power supplied to said motor in response to variations in the phase of triggering said current switching device relative to the supplied A.C. power; means for selectively reversing said motor;
    a controller including manually operated switch means and means for generating a D.C. reference signal the amplitude of which changes linearly with respect to time in response to operation of said switch means, said amplitude representing a desired linear change in the speed of said motor;
    means for providing a D.C. feedback signal the amplitude of which varies as a function of the speed of said motor; and
    means responsive to the relative amplitudes of said reference signal and said feedback signal for varying the phase of triggering of said current switching device, whereby the power supplied to said motor is varied to change linearly the speed of said motor in accordance with said D.C. reference signal thereby to provide substantially constant lateral acceleration of the hoist.

2. Apparatus as set forth in claim 1 wherein said controller includes a capacitor and means for selectively charging and discharging the capacitor at a substantially constant rate whereby the voltage across said capacitor is a linear function of time, the amplitude of said D.C. reference signal corresponding to the voltage across said capacitor.

3. Apparatus as set forth in claim 2 wherein said means for selectively charging and discharging said capacitor includes a series bootstrap charging circuit.

4. Apparatus as set forth in claim 2 wherein said controller further includes means, controlled by said switch means, for charging said capacitor to a relatively low voltage representing a low motor speed for inching the hoist laterally.

5. Apparatus as set forth in claim 2 wherein said means for selectively charging and discharging said capacitor includes respective series circuits for charging and for discharging the capacitor each of said circuits comprising:
    respective means for generating a voltage approximately equal to the voltage across the capacitor;
    a substantially constant D.C. voltage source;
    an impedance connected in series with said D.C. voltage source, said switch means including means for connecting said voltage source and impedance in series with said capacitor, whereby the current flowing in each of said circuits is substantially constant.

6. Apparatus as set forth in claim 5 wherein said impedance is variable for varying the rate of charging and discharging of said capacitor.

7. Apparatus as set forth in claim 5 including means for preventing the voltage across said capacitor upon charging thereof from exceeding a predetermined maximum.

8. Apparatus as set forth in claim 7 wherein the last means comprises a diode clamping circuit, said diode becoming conductive for preventing further charging of said capacitor when the voltage thereacross reaches said predetermined maximum.

9. Apparatus as set forth in claim 5 wherein each of said voltage generating means comprises a transistor emitter follower circuit.

10. Apparatus as set forth in claim 9 wherein each of said emitter follower circuits comprises a Darlington coupled pair of transistors, said capacitor being connected in a circuit with the base of a first one of said pair, the emitter of the second one of said pair being at a voltage approximately equal to the voltage at said base, said emitter voltage representing said D.C. reference signal.

11. Apparatus as set forth in claim 1 wherein said means for providing a D.C. feedback signal comprises an A.C. tachometer driven by said motor and means for rectifying the A.C. signal generated by said tachometer to provide said D.C. feedback signal.

12. Apparatus as set forth in claim 1 wherein said triggerable semiconductor current switching device comprises an SCR.

13. Apparatus as set forth in claim 1 wherein said circuit for supplying A.C. power to said motor comprises a pair of SCR's which are oppositely connected in parallel for alternative conduction on successive A.C. half cycles.

14. Apparatus as set forth in claim 1 wherein said motor is a single-phase squirrel-cage induction motor.

15. Apparatus as set forth in claim 1 wherein said means for varying the phase of triggering of said current switching device comprises:
   a capacitor;
   means providing a relatively high impedance current source for charging said capacitor at a rate which varies as a function of the amplitude of said D.C. signal;
   means including a Schmitt trigger circuit for discharging said capacitor in synchronism with the phase of the A.C. applied to said motor; and
   means for triggering said current switching device when the charge on said capacitor reaches a predetermined level.

16. A control for an A.C. motor for accelerating the motor with constant angular acceleration, comprising:
   a circuit for supplying A.C. power to said motor, said circuit including at least one triggerable semiconductor current switching device for varying the average A.C. power supplied to said motor in response to variations in the phase of triggering said current switching device relative to the supplied A.C. power;
   means for supplying a D.C. feedback signal the amplitude of which varies as a function of the angular velocity of said motor;
   means for generating a D.C. reference signal, said means including a capacitor and means for selectively charging and discharging said capacitor at a substantially constant selectable rate, the amplitude of said reference signal corresponding to the charge on said capacitor and being a linear function of time, the rate of change of said function thereby being a selectable constant, said amplitude representing a desired linear change in the angular velocity of said motor; and
   means responsive to the relative amplitudes of said reference signal and said feedback signal for varying the phase of triggering of said current switching device whereby the power supplied to said motor is varied to change the angular velocity of said motor with constant angular acceleration.

17. A control as set forth in claim 16 wherein said triggerable semiconductor current switching device comprises an SCR.

18. A control as set forth in claim 16 wherein said means for selectively charging and discharging said capacitor includes a series boostrap charging circuit.

19. A control as set forth in claim 16 wherein said means for varying the phase of triggering of said current switching device comprises:
   a capacitor;
   means for combining said D.C. reference signal and said D.C. feedback signal to obtain an error signal;
   means for charging said capacitor at a rate which varies as a function of the amplitude of said error signal;
   means for discharging said capacitor in synchronism with the phase of the A.C. applied to said motor; and
   means for triggering said current switching device when the charge on said capacitor reaches a predetermined level.

References Cited
UNITED STATES PATENTS

| | | | |
|---|---|---|---|
| 3,181,046 | 4/1965 | Sutton | 318—207X |
| 3,402,335 | 9/1968 | Smith et al. | 318—202 |
| 3,430,122 | 2/1969 | Krabbe et al. | 318—203 |

ORIS L. RADER, Primary Examiner

G. Z. RUBINSON, Assistant Examiner

U.S. Cl. X.R.

318—207, 227